(12) United States Patent
Kesper

(10) Patent No.: US 7,980,128 B2
(45) Date of Patent: Jul. 19, 2011

(54) LEVEL MONITORING SYSTEM

(75) Inventor: Heinrich Kesper, Willingen (DE)

(73) Assignee: Hoppecke Batterien GmbH & Co. KG (DE)

( * ) Notice: Subject to any disclaimer, the term of this patent is extended or adjusted under 35 U.S.C. 154(b) by 565 days.

(21) Appl. No.: 12/084,276

(22) PCT Filed: Nov. 24, 2006

(86) PCT No.: PCT/EP2006/011282
§ 371 (c)(1),
(2), (4) Date: Apr. 29, 2008

(87) PCT Pub. No.: WO2007/065568
PCT Pub. Date: Jun. 14, 2007

(65) Prior Publication Data
US 2009/0098444 A1    Apr. 16, 2009

(30) Foreign Application Priority Data
Dec. 8, 2005 (DE) .................... 20 2005 019 220 U

(51) Int. Cl.
*G01F 23/00* (2006.01)
(52) U.S. Cl. ...................................... 73/290 R

(58) Field of Classification Search ................. 73/290 R
See application file for complete search history.

(56) References Cited

U.S. PATENT DOCUMENTS
4,981,764 A    1/1991    Dattilo

FOREIGN PATENT DOCUMENTS
| | | |
|---|---|---|
| CN | 2734241 | 10/2005 |
| JP | 60-037679 A | 2/1985 |
| JP | 01-194801 A | 8/1989 |
| JP | 09-055233 A | 2/1997 |
| JP | 2000-323184 | 11/2000 |

OTHER PUBLICATIONS

Translation of International Preliminary Report on Patentability for PCT/EP2006/011282 (Aug. 14, 2008).

*Primary Examiner* — Hezron Williams
*Assistant Examiner* — Alex Devito
(74) *Attorney, Agent, or Firm* — Harness, Dickey & Pierce, P.L.C.

(57) ABSTRACT

In order to provide an improved level monitoring system for monitoring the electrolyte fill level of an accumulator, the present invention proposes a level monitoring system having a level monitoring device and a signal output device (10) which is arranged in a separate housing, receives signals representing the fill level of the electrolyte from the level monitoring device and outputs at least one corresponding fill level signal.

20 Claims, 2 Drawing Sheets

LEVEL MONITORING SYSTEM

CROSS-REFERENCE TO RELATED APPLICATIONS

This application is a U. S. National Stage Application of International application No. PCT/EP2006/011282, filed Nov. 2, 2006 and published in German as WO 2007/065568 A1 on Jun. 14, 2007. This application claims the benefit of German Application DE 20 2005 019 220.1, filed Dec. 8, 2005. The disclosure(s) of the above applications are incorporated herein by reference.

The present invention relates to a level monitoring system for monitoring a fill level of a battery or an accumulator.

In the state of the art accumulators are widely used as electric energy storage means. In course of time the electrolyte of an accumulator is gradually decomposed by recurrent charging and discharging cycles, whereby hydrogen and oxygen in form of gas escape from the electrolyte. In order to assure the correct functioning of the accumulator and to prevent a damage of the same one, these escaped gases have to be refilled in form of purified water. In order to determine the right time of refilling, the fill level of the electrolyte can be monitored. If this one remains beneath a pre-determined limit, purified water has to be refilled in order to prevent a damage of the accumulator.

For monitoring the fill level, different methods and devices are known.

So called floats can be for example used which, in dependence of the fill level of the electrolyte, influence an optical display that is directly fixed on the accumulator by means of a corresponding lever apparatus. Herein it is a disadvantage that such optical displays are often difficult to read, in particular when the accumulator and thus the fill level display are positioned at points that are difficult to observe by the maintenance staff.

Furthermore, electronic level monitoring devices are known that detect the fill level for example by means of a sensor electrode that immerses into the electrolyte. Via a luminous signal transmitter, for example a light diode that is placed outside the accumulator casing it is indicated to the maintenance staff whether purified water has to be added to the electrolyte. A luminous signal transmitter has the advantage that this one can be better seen by the maintenance staff both from distance and in the dark. But if the accumulator is positioned at sites that are difficult to observe for the maintenance staff, such a luminous signal transmitter is also correspondingly difficult to read.

It is an object of the present invention to provide an improved level monitoring system for monitoring a fill level of an electrolyte of an accumulator.

This aim is achieved according to the present invention by a level monitoring system according to claim 1. The associated claims refer to individual embodiments of the present invention.

The level monitoring system for monitoring the fill level of an accumulator electrolyte comprises a level monitoring device and a signal output device that receives signals representing the fill level of the electrolyte from the level monitoring device and emits at least one corresponding signal. According to the invention, the signal output device comprises a separate housing. The level monitoring device being positioned on the accumulator in the state of use, the signal output device can be correspondingly provided in a position that is spaced from the level monitoring device. If for example an accumulator, the electrolyte liquid level of which is monitored by means of the level monitoring system according to the invention, is placed at a site that is difficult to observe for the maintenance staff, the signal output device of the level monitoring system according to the invention can be positioned separately from the accumulator at a place that is better to observe, such that the fill level of the electrolyte can be read by the maintenance staff without any problems.

Principally, as level monitoring device each known level monitoring device can be used that is suitable to provide an electric output signal that represents the fill level of the electrolyte. Herein, the fill level can be either detected precisely by the level monitoring device, for example in volume units, or it can be detected whether the fill level remains beneath a pre-determined limit.

The output signal of the level monitoring device is transmitted to the signal output device, which can be for example realized via a cable connection, a radio link or the like.

The signal output device in turn can emit optical and/or acoustic signals that represent the fill level of the electrolyte and show the maintenance staff whether the electrolyte has to be refilled or not. For the optical signal output the signal output device can for example comprise one or more light diodes. If only one light diode is used, this one will for example preferably shine continuously if sufficient electrolyte is present in the accumulator. If however the fill level of the electrolyte remains beneath the given limit, the light diode will start blinking in order to draw the maintenance staffs attention to the fact that the electrolyte has to be refilled. A multicoloured light diode can also be used that continuously emits a green light signal as long as the fill level is o.k. and emits a red blinking light signal if the electrolyte has to be refilled. The frequency with which the light diode is blinking in this case can for example increase with an increasing reduction of the fill level, in order to indicate the urgency of refill in this manner. If however two light diodes are used, these ones will preferably shine in different colours, for example green and red. If the green lamp is shining, it has not to be worried about the fill level of the electrolyte. If however the red lamp is shining, the electrolyte has to be refilled. Also here light diodes can be used that emit blinking signals, since blinking signals are better recognized by the maintenance staff in particular during daylight.

The signal output device of the level monitoring system according to the invention preferably comprises one fixing agent by means of which the signal output device can be fixed on an object. Advantageously, the fixing agent is at least one clamping element, by means of which the signal output device can be fixed on a cable, for example a charging cable that leads to the accumulator and that can be connected to another charging cable of a charging device.

According to another preferred embodiment of the level monitoring system according to the invention, the signal output device is located on a plug of a charging cable that leads to an accumulator or is integrated in this plug which serves for receiving a corresponding counter-plug of a charging cable that leads to a charging device. In this way, the staff introducing the plug of the charging cable that leads to the charging device into the plug of the charging cable that leads to the accumulator can simultaneously read and control the fill level of the electrolyte.

In the following, the present invention will be described in further detail with reference to the drawing. Herein:

The same reference numerals refer in the following to the same components.

Figure 2:
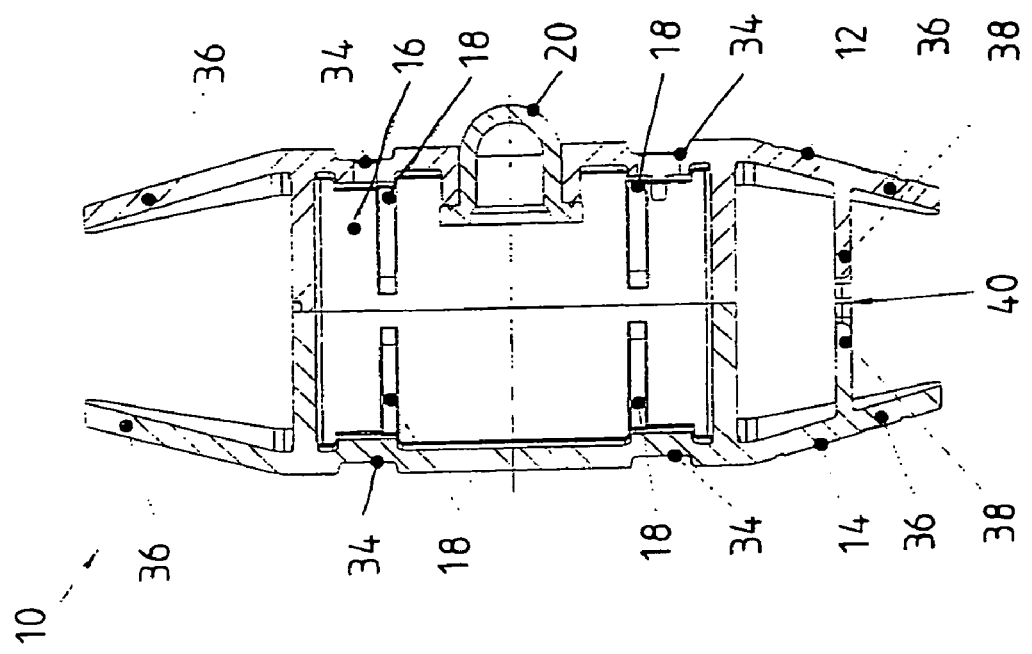
FIG. 2 is a cross sectional side view of the signal output device represented in FIG. 1 along the line II-II in FIG. 1.
Figure 3:
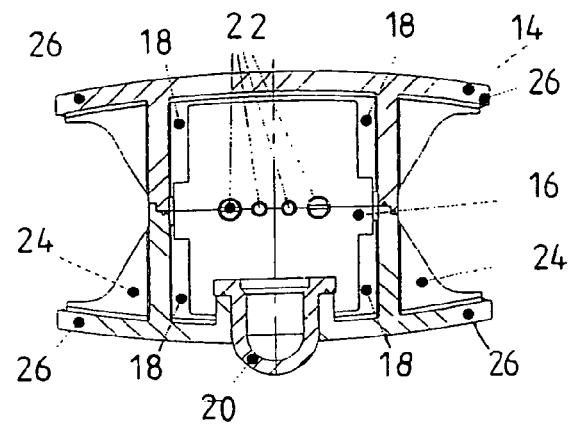
FIG. 3 is a cross sectional side view of the signal output device represented in FIGS. 1 and 2 along the line III-III in FIG. 1

FIGS. 1 through 4 show an exemplary embodiment of a signal output device 10 of the level monitoring system according to the invention. As it is shown in FIGS. 2 and 3, the signal output device 10 comprises a housing composed of an upper shell 12 and a lower shell 14. The upper shell 12 and the lower shell 14 are preferably fixed to each other in a detachable manner by means of appropriate means, such that the housing can be subsequently opened in order to carry out corresponding repair works, for example. The housing can also be made in one piece, of course. This can be for example advantageous when the signal output device 10 is subject to a high stress of vibrations. The upper shell 12 and the lower shell 14 form together a hollow space 16 which is preferably closed in a dustproof and liquid-proof manner with respect to the environment. In the hollow space, holding elements 18 extend both from the upper shell 12 and from the lower shell 14, wherein a non represented board can be received between the said holding elements, on which board electronic components of the signal output device 10 are placed. In the upper shell 12 an opening is formed, in which a signal output device in form of a light diode 20 is held in a detachable manner, in order to be able to replace this one in case of a failure. The light diode 20 is actively connected to the non represented board using appropriate means. As it is shown in FIG. 3, cable connection openings 22 are provided on a side of the housing, through which openings cables are guided which serve for supplying the signal output device 10 with power as well as for transmitting signals of a non represented level monitoring device of the level monitoring system according to the invention to the signal output device 10.

Figure 4:
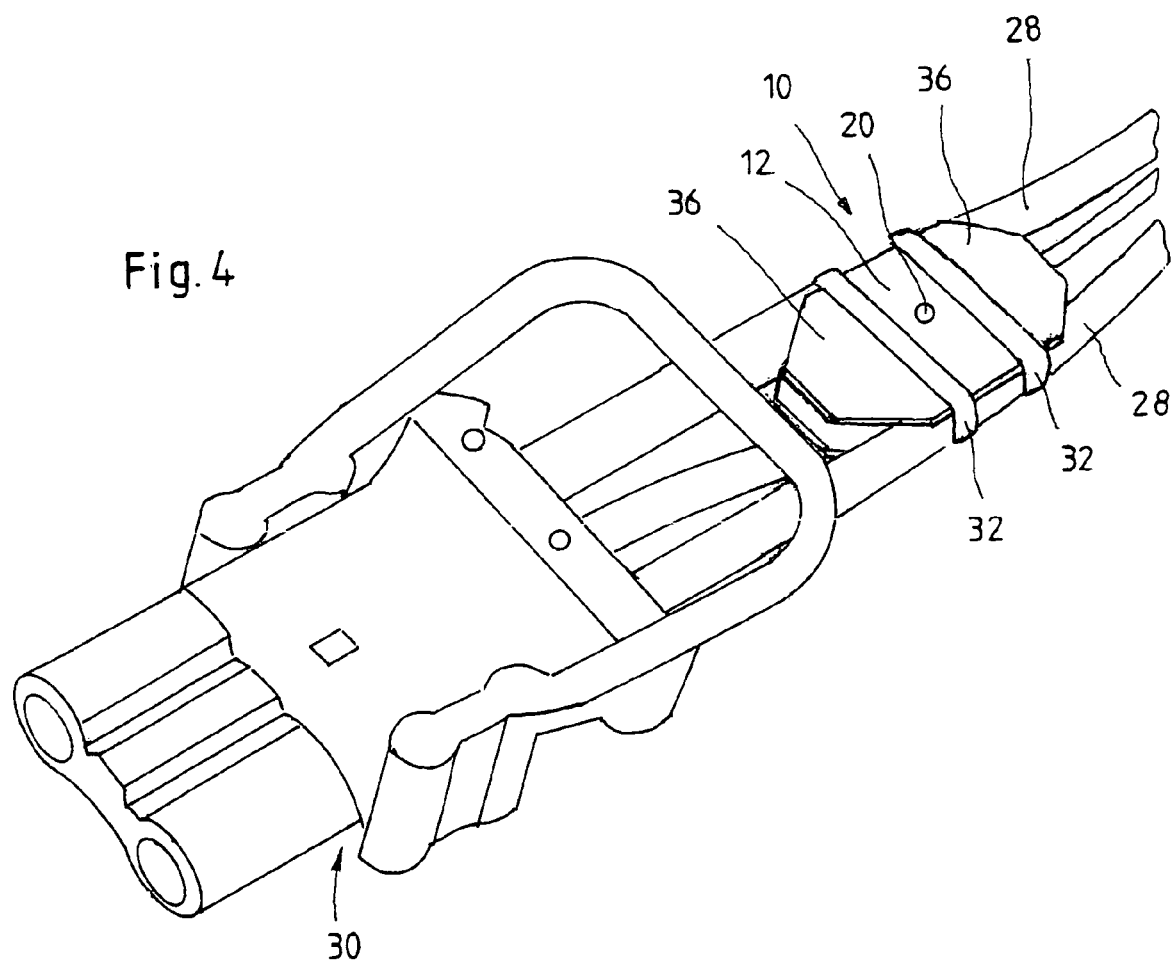
FIG. 4 is a perspective view of the signal output device represented in FIGS. 1 through 3, which is placed between two charging cables that lead to an accumulator.

Furthermore, clamping elements 24 are integrally formed with the housing on two facing housing sides, in form of elastic clamping arms 26 which project outwards from the upper shell 12 as well as from the lower shell 14 and are respectively inclined towards each other. Cables 28 can be received between these clamping arms 26, as it is shown in FIG. 4. These cables can be for example charging cables which lead into the one direction to a non represented accumulator and into the other direction to a non represented plug 30 that serves for receiving a charging cable which leads to a charging device or for being received in a corresponding connection of the charging device itself.

Figure 1:
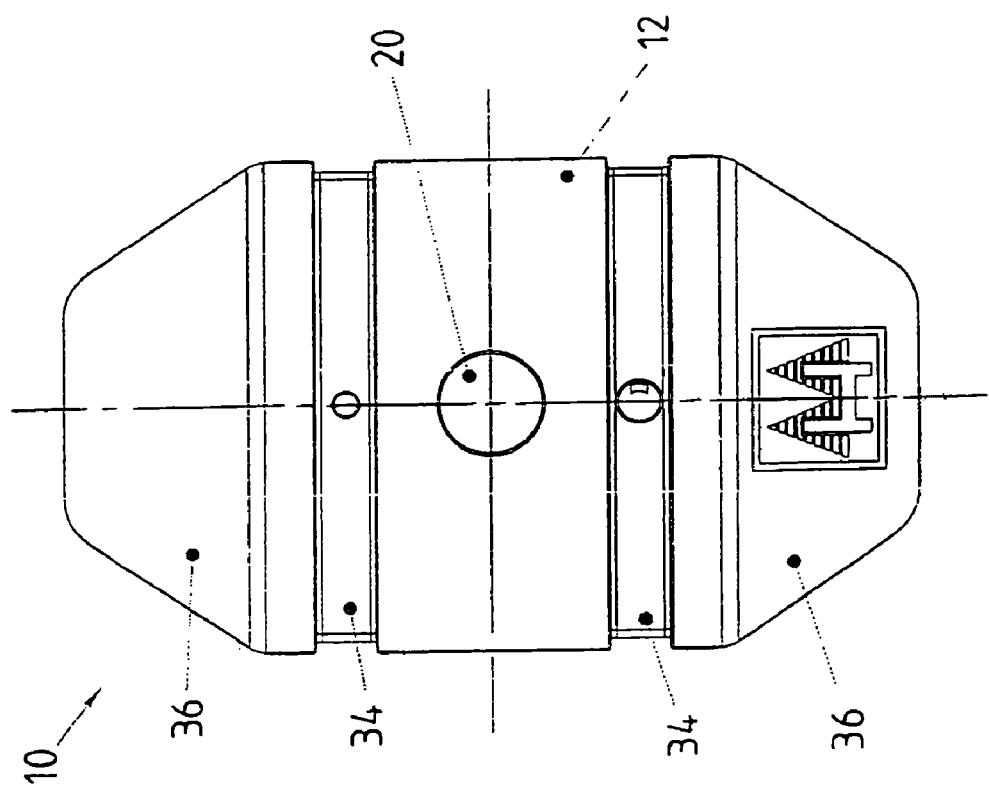
FIG. 1 is a top view of an embodiment of a signal output device of the level monitoring system according to the invention.

In order to safely hold the signal output device 10 between the cables 28, cable binding like fixing elements 32 are laid around the signal output device 10 and the cables 28, which engage in corresponding reception grooves 34 that are formed on the outside of the upper shell 12 and the lower shell 14, as it is visible in FIGS. 1 and 2.

Furthermore, respectively two mutually spaced housing sections 36 which extend outwards and are inclined towards each other are formed on facing housing sides of the housing of the signal output device 10. From two of these housing sections 36, that are placed on such housing side on which also the cable connection openings are located, respectively one web-like housing section 38 extends essentially in the transverse direction with respect to the corresponding housing section 36, wherein the two web-like housing sections 38 face each other and extend towards each other such that a gap 40 is formed between these ones. The housing sections 36 form together with the web-like housing sections 38 a tension relief for the cables that are connected to the signal output device 10 and that are inserted into the corresponding cable connection openings 22.

The level monitoring device of the level monitoring system according to the invention that is not represented in the figures detects the fill level of the electrolyte of a neither shown accumulator and transmits signals representing the fill level of the electrolyte to the signal output device 10. The transmission can optionally be realized via data transmitting cables or via a radio connection. In the latter case the level monitoring device comprises a signal output device and the signal output device 10 comprises a signal reception device. If the transmitted fill level signals indicate that still sufficient electrolyte is present in the accumulator, the light diode 20 will shine continuously. If this is however not the case, the light diode starts blinking in order to indicate that the electrolyte has to be refilled. If the light diode 20 is not shining at all, one can assume a defect of the light diode, whereupon this one has to be replaced in order to assure a safe operation of the accumulator.

It is to be understood that the above described exemplary embodiment is not limiting. Modifications and changes are rather possible without leaving the protection scope of the present invention that is defined by the annexed claims.

The invention claimed is:

1. A level monitoring system for monitoring the fill level of an electrolyte of an accumulator, the system comprising:
    a level monitoring device detecting the fill level of the electrolyte of the accumulator and transmitting a signal representing the fill level of the electrolyte;
    a signal output device receiving said signals from the level monitoring device and outputting at least one corresponding fill level signal;
    a housing being composed of an upper shell and a lower shell, wherein the signal output device is arranged in the housing; and
    at least one clamping element provided by the housing in order to affix the housing to a cable, wherein the clamping element is integrally formed with the housing, the clamping element comprising two elastic clamping arms, which project from the upper as well as the lower shell and which are inclined toward each other in order to receive the cable therebetween.

2. The level monitoring system according to claim 1, wherein a cable connection for signal transmission is provided between the level monitoring device and the signal output device.

3. The level monitoring system according to claim 1, wherein a radio link for signal transmission is provided between the level monitoring device and the signal output device.

4. The level monitoring system according to claim 1, wherein the signal output device at least comprises one fixing agent by means of which the signal output device can be fixed on another object.

5. The level monitoring system according to claim 4, wherein the at least one clamping element is provided as the fixing agent, by means of which the signal output device can be fixed on a cable.

6. The level monitoring system according to claim 1, wherein the signal output device is located on a plug of a charging cable that leads to an accumulator or is integrated in this plug which serves for receiving a corresponding counter-plug of a charging cable that leads to a charging device.

7. The level monitoring system according to claim 2, wherein the signal output device at least comprises one fixing agent by means of which the signal output device can be fixed on another object.

8. The level monitoring system according to claim 3, wherein the signal output device at least comprises one fixing agent by means of which the signal output device can be fixed on another object.

9. The level monitoring system according to claim 7, wherein the at least one clamping element is provided as the fixing agent, by means of which the signal output device can be fixed on a cable.

10. The level monitoring system according to claim 8, wherein the at least one clamping element is provided as the fixing agent, by means of which the signal output device can be fixed on a cable.

11. The level monitoring system according to claim 2, wherein the signal output device is located on a plug of a charging cable that leads to an accumulator or is integrated in this plug which serves for receiving a corresponding counter-plug of a charging cable that leads to a charging device.

12. The level monitoring system according to claim 3, wherein the signal output device is located on a plug of a charging cable that leads to an accumulator or is integrated in this plug which serves for receiving a corresponding counter-plug of a charging cable that leads to a charging device.

13. The level monitoring system according to claim 4, wherein the signal output device is located on a plug of a charging cable that leads to an accumulator or is integrated in this plug which serves for receiving a corresponding counter-plug of a charging cable that leads to a charging device.

14. The level monitoring system according to claim 5, wherein the signal output device is located on a plug of a charging cable that leads to an accumulator or is integrated in this plug which serves for receiving a corresponding counter-plug of a charging cable that leads to a charging device.

15. The level monitoring system according to claim 7, wherein the signal output device is located on a plug of a charging cable that leads to an accumulator or is integrated in this plug which serves for receiving a corresponding counter-plug of a charging cable that leads to a charging device.

16. The level monitoring system according to claim 8, wherein the signal output device is located on a plug of a charging cable that leads to an accumulator or is integrated in this plug which serves for receiving a corresponding counter-plug of a charging cable that leads to a charging device.

17. The level monitoring system according to claim 9, wherein the signal output device is located on a plug of a charging cable that leads to an accumulator or is integrated in this plug which serves for receiving a corresponding counter-plug of a charging cable that leads to a charging device.

18. The level monitoring system according to claim 10, wherein the signal output device is located on a plug of a charging cable that leads to an accumulator or is integrated in this plug which serves for receiving a corresponding counter-plug of a charging cable that leads to a charging device.

19. A level monitoring system for monitoring fill level of an electrolyte of an accumulator, the system comprising:
a signal output device configured to receive fill level signals from a level monitoring device that is configured to detect a fill level of the electrolyte of the accumulator, the signal output device comprising:
a housing including a first shell and a second shell that is positioned opposite to the first shell;
a first clamping element and a second clamping element that is opposite to the first clamping element, each of the first and second clamping elements include two opposing elastic clamping arms that project from the first shell and the second shell respectively, the elastic clamping arms are inclined toward each other and configured to receive a cable there between;
a hollow space defined by the first shell and the second shell, the hollow space is between the first clamping element and the second clamping element;
electronic components of the signal output device mounted in the hollow space;
cable connection openings defined by the housing configured to receive a power line for the signal output device; and
a notification device between the first clamping element and the second clamping element, the notification device included in one of the first shell or the second shell, the notification device emits a signal representing the fill level of the electrolyte.

20. A level monitoring system for monitoring fill level of an electrolyte of an accumulator, the system comprising:
a level monitoring device configured to detect the fill level of the electrolyte and transmit a fill level signal;
a signal output device spaced apart from the level monitoring device and configured to receive the fill level signal from the level monitoring device, the signal output device including:
a first clamping element and a second clamping element, the first clamping element is opposite to the second clamping element;
a hollow space defined by a housing of the signal output device, the hollow space is between the first clamping element and the second clamping element;
electronic components of the signal output device mounted in the hollow space; and
a notification device between the first clamping element and the second clamping element, the notification device emits a signal representing fill level of the electrolyte;
wherein the signal output device is mounted to at least one cable through interaction between one of the first and the second clamping elements and the cable; and
wherein the cable is connected to the accumulator.

* * * * *